United States Patent [19]

Ozaki et al.

[11] 4,080,494
[45] Mar. 21, 1978

[54] PROCESS FOR PRODUCING ACRYLONITRILE POLYMER MELT EMPLOYING $H_2O_2$ POLYMERIZATION CATALYST AT A TEMPERATURE OF AT LEAST 80° C CONTAINING 3-80% WATER IN THE SYSTEM

[75] Inventors: Masahiko Ozaki; Kenichi Ono, both of Okayama, Japan

[73] Assignee: Japan Exlan Company Limited, Osaka, Japan

[21] Appl. No.: 770,762

[22] Filed: Feb. 22, 1977

[30] Foreign Application Priority Data

Feb. 27, 1976    Japan .................................. 51-21582

[51] Int. Cl.$^2$ ......................... C08F 4/30; C08F 20/10; C08F 20/44
[52] U.S. Cl. .................................. 526/229; 526/328; 526/341; 526/342
[58] Field of Search ................ 526/229, 341, 328, 342

[56] References Cited

U.S. PATENT DOCUMENTS

| | | | |
|---|---|---|---|
| 3,673,168 | 6/1972 | Burke et al. | 526/229 |
| 3,686,112 | 8/1972 | Vrancken et al. | 526/229 |
| 3,873,508 | 3/1975 | Turner | 526/86 |

*Primary Examiner*—Herbert J. Lilling
*Attorney, Agent, or Firm*—Wenderoth, Lind & Ponack

[57] ABSTRACT

An improved process for producing an acrylonitrile melt by polymerizing acrylonitrile alone or a monomer mixture consisting of at least 75% of acrylonitrile and as the remainder at least one different ethylenically unsaturated compound in a system where water is present in an amount from 3 to 80% by weight based on the total amount of the monomer(s) and water, under a pressure above the self-generated pressure at a temperature above 80° C. The improvement is characterized by the use of hydrogen peroxide as the polymerization initiator.

10 Claims, No Drawings

PROCESS FOR PRODUCING ACRYLONITRILE POLYMER MELT EMPLOYING H₂O₂ POLYMERIZATION CATALYST AT A TEMPERATURE OF AT LEAST 80° C CONTAINING 3–80% WATER IN THE SYSTEM

The present invention relates to an improved process for producing an acrylonitrile polymer melt. More particularly, the invention relates to a process for producing an acrylonitrile polymer in a substantially melted state by polymerizing acrylonitrile alone or a monomer mixture containing acrylonitrile in the presence of water at high temperature under increased pressure, wherein hydrogen peroxide is used as the polymerization initiator, whereby a runaway of the polymerization reaction is effectively suppressed, and at the same time the melting of the resulting polymer is facilitated and an acrylonitrile polymer melt of improved whiteness having a proper range of molecular weights is produced in an industrially advantageous manner.

In recent years, it has been revealed that, when an acrylonitrile polymer is treated at high temperature under increased pressure in the presence of a small amount of a non-solvent, the polymer and the non-solvent form a homogeneous fluid which shows a fluidity like that of the melt of polyesters or polyamides. As regards processes for producing fibers by spinning such a fluid (referred to as melt), several proposals have been made as seen in U.S. Pat. No. 3,388,202, Japanese laid-open patent application Nos. 28982/1973, 49839/1973, 52832/1973, etc. In particular, most of these processes use water as the non-solvent for acrylonitrile polymers, and it is a remarkable feature of such processes that acrylic synthetic fibers are obtained without using conventional expensive solvents such as dimethylformamide, dimethyl sulfoxide, aqueous thiocyanate solutions, concentrated nitric acid.

By applying this melting phenomenon to a polymerization system, there has been proposed (U.S. Pat. No. 3,873,508) a process for the production of an acrylonitrile polymer melt simultaneously with the polymerization of acrylonitrile, and since the use of such acrylonitrile polymer melt in the production of fibers, etc. is receiving attention from the viewpoint of process contraction (simplification), cost reduction, material economy, prevention of environmental pollution, etc.

In all these processes, however, high-temperature pressurized conditions exceeding one hundred and several ten degrees are employed to melt acrylonitrile polymers in the presence of water. Accordingly, these processes involve various problems awaiting solution in the quality of the resulting polymer and industrial operations, including discoloration of the polymer, danger to high temperature operations, increased energy cost due to high-temperature maintenance, ensurance of safety, reduction in cost, etc.

Especially, in such a processes as the above-mentioned United States Patent in which an acrylonitrile polymer melt is produced simultaneously with the polymerization of acrylonitrile, monomer is present at high concentration in the polymerization system and the polymerization system becomes highly viscous, so that an abnormal temperature rise due to a runaway of the polymerization reaction and local accumulation of heat due to a drop in heat transfer are caused, by which the discoloration of the resulting melt becomes more remarkable. With the enlargement of the scale of the process, such a runaway of the polymerization reaction and accumulation of heat become more and more knotty problems, not only aggravating the discoloration of the polymer but also widening the molecular weight distribution of the polymer, and moreover affording even a possibility of creating a dangerous condition of causing the explosion of the polymerization tank by extraordinary pressure elevation.

In the light of such a situation of prior art, we made an intensive study to overcome such drawbacks. As a result, it has been found that, in the above-mentioned process for obtaining an acrylonitrile polymer melt by the polymerization at high temperature under increased pressure, when hydrogen peroxide is used as the polymerization initiator, it is possible to produce an acrylonitrile polymer in a substantially melted state, in an industrially advantageous manner.

A principal object of the present invention is, therefore, to produce an acrylonitrile polymer in a substantially melted state, stably and easily, without causing any runaway reaction.

Another object of the present invention is to provide a polymerization initiator which can facilitate the polymerization operation and the preparation and sully of polymerization liquid and can give an acrylonitrile polymer of good quality and whose polymerization speed depends very little on temperature.

Another object of the present invention is to produce, by an energy-economizing, highly productive and simple process, an acrylonitrile polymer melt less colored and very excellent in quality and high in industrial efficiency, which can be immediately supplied to shaping operations, such as spinning, film-formation or extrusion shaping.

Still another object of the present invention is to provide a lowered viscosity of the melt by suitably controlling the degree of polymerization of the acrylonitrile polymer, thereby improving the extrusion shaping ability of the melt, and at the same time facilitating the melting of the resulting polymer, and moreover to improve the whiteness of the polymer remarkably.

Other objects of the present invention will become apparent from the following concrete explanation of the invention.

According to the present invention — in producing an acrylonitrile polymer in a substantially melted state by polymerizing acrylonitrile alone or a polymer mixture consisting mainly of acrylonitrile and as the remainder at least one different ethylenically unsaturated compound in a system in which water is present in an amount in the range of from 3 to 80 weight percent based on the total weight of the monomer(s) and water, under a pressure above the self-generated pressure at a temperature not lower than 80° C. — there is employed hydrogen peroxide as the polymerization initiator. By employing the polymerization technique using this polymerization initiator, an acrylonitrile polymer melt remarkably improved in whiteness can be produced for in an industrially advantageous manner, with the runaway of the polymerization reaction being suppressed.

The fact that hydrogen peroxide alone can be thus advantageously used as the polymerization initiator in this specific polymerization process of acrylonitrile, has not been expected from the behavior of acrylonitrile in the conventional polymerization process using hydrogen peroxide only by which only a low polymerization ratio has been attained, and it is also an important feature of the present invention that, by the use of hydrogen peroxide, the discoloration of the melt is markedly suppressed, that is, an acrylonitrile polymer melt having very good whiteness can be obtained.

As distinct from polymerization initiators like azo compounds and organic peroxides, in the case of hydrogen peroxide the polymerization speed of acrylonitrile is not so greatly influenced by temperature. Therefore, any special polymerization operation is not required upon variation of polymerization temperature, and a rapid progress of polymerization is difficult by a rise of polymerization temperature, so that it is possible to obtain an acrylonitrile polymer melt improved in quality, stably and high in operation efficiency.

Since hydrogen peroxide can be used in mixture with water in any ratio, it can be supplied to the polymerization system separately from the monomer solution. Therefore, it is possible to prevent any polymerization reaction that otherwise may proceed in the monomer solution until it is supplied to the polymerization system, and it is also possible to avoid any explosion in the supply system (including tanks, pipes, etc.) caused by a runaway of the polymerization reaction in the monomer solution. Thus, all difficulties have been overcome which are encountered in the conventional process in which a water-soluble polymerization initiator is dissolved in the monomer liquid and then supplied to the polymerization system.

Furthermore, since the decomposed products of hydrogen peroxide, as distinct from the case of the conventional azo compounds or organic peroxides, are only water and oxygen, they do not pollute the polymerization product nor do they cause any environmental pollution, such as elevating the COD or BOD in waste water. This is another feature of the present invention.

The high-temperature pressurized polymerization of the present invention is applicable to the polymerization of acrylonitrile alone or a monomer mixture consisting mainly of acrylonitrile (preferably no less than about 75 weight percent) and as the remainder at least one different ethylenically unsaturated compound. Among the different ethylenically unsaturated compounds which are the copolymerization components, there may be recited well-known compounds copolymerizable with acrylonitrile, for example vinyl halides and vinylidene halides such as vinyl chloride, vinyl bromide, vinyl fluoride, vinylidene chloride, etc.; unsaturated carboxylic acids such as acrylic acid, methacrylic acid, maleic acid, itaconic acid, etc. and their salts; acrylic acid esters such as methyl acrylate, ethyl acrylate, butyl acrylate, octyl acrylate, methoxyethyl acrylate, phenyl acrylate, cyclohexyl acrylate, etc.; methacrylic acid esters such as methyl methacrylate, ethyl methacrylate, butyl methacrylate, octyl methacrylate, methoxyethyl methacrylate, phenyl methacrylate, cyclohexyl methacrylate, etc.; unsaturated ketones such as methyl vinyl ketone, phenyl vinyl ketone, methyl isopropenyl ketone, etc.; vinyl esters such as vinyl formate, vinyl acetate, vinyl propionate, vinyl butyrate, vinyl benzoate, etc.; vinyl ethers such as methyl vinyl ether, ethyl vinyl ether, etc.; acrylamide and its alkyl-substituted compounds; unsaturated sulfonic acids such as vinylsulfonic acid, allylsulfonic acid, methallylsulfonic acid, p-styrenesulfonic acid, etc. and their salts; styrenes such as styrene, α-methylstyrene, chlorostyrene, etc. and their alkyl- or halogen substituted compounds; allyl alcohol and its esters and ethers; basic vinyl compounds such as vinylpyridine, vinylimidazole, dimethylaminoethyl methacrylate, etc.; unsaturated aldehydes such as acrolein, methacrolein, etc.; unsaturated nitriles such as methacrylontrile, vinylidene cyanide, etc.; and cross-linkable vinyl compounds such as glycidyl methacrylate, N-methylolacrylamide, hydroxyethyl methacrylate, divinylbenzene, ethylene glycol diacrylate, etc.

In the polymerization process according to the present invention using such monomers, water is made present in an amount in the range of from 3 to 80 weight percent, preferably 3 to 50 weight percent, more preferably 5 to 30 weight percent, based on the total weight of the monomer(s) and water which form the polymerization system. Also, it is necessary that the polymerization system should be maintained under a pressure above the self-generated pressure, namely under a pressure above the vapor pressure generated in the polymerization system under the polymerization conditions. Further, it is necessary to employ as the polymerization temperature a temperature not lower than 80° C., preferably not lower than 120° C., more preferably not lower than 130° C. When a polymerization temperature between 80° and 120° C. is employed, it is desirable that the polymerization ratio (conversion) should be maintained not lower than 45 %, preferably above 50 %. Only by satisfying such polymerization conditions, a flowable transparent acrylonitrile polymer melt can be obtained, and the employment of polymerization conditions outside these ranges makes difficult the attainment of the objects and effects. It is desirable that the upper limit of the polymerization temperatures should be not higher than 300° C., preferably below 250° C., in consideration of the deterioration of the quality of the resulting polymer, for example the decomposition, discoloration, etc.

The polymerization according to the present invention is carried out in a closed system or in a polymerization apparatus equipped with a suitable pressurizing means to maintain a pressure above the vapor pressure generated in the polymerization system under the polymerization conditions (see self-generated pressure), generally between about 2 and about 3 atmospheres, or above. For the polymerization pressure, any pressure may be used which is above the above-mentioned vapor pressure (the self-generated pressure). For example, under a high pressure above 100 atmospheres, or even above 1000 atmospheres, the polymerization operation according to the present invention can be carried out. However, it is suitable to polymerize generally under a pressure between about 3 atomspheres and about 100 atmospheres, in view of the easiness of industrial operation and for the facility of removing the resulting polymer melt from the polymerization system.

Under such polymerization conditions, a polymerization initiator composed of hydrogen peroxide is used as the polymerization means in the present invention. It is desirable to supply hydrogen peroxide as an aqueous solution separately from the monomer solution to the polymerization system, but as the case may be it is possible to dissolve an aqueous hydrogen peroxide solution in the monomer solution and supply the resulting solution to the polymerization system. As regards the aqueous solutions of hydrogen peroxide used in the present invention, solutions of various concentrations may be used depending on the polymerization conditions, but generally a solution of a concentration below 90 %, preferably below 35 %, is advantageously used. The amount of use of hydrogen peroxide as the polymerization initiator is selected generally within a range of from 0.1 to 8 weight percent, preferably from 0.3 to 5 weight percent based on the monomer.

The molecular weight regulation of the polymer to be formed in the present invention can be achieved by varying the amount of hydrogen peroxide and also by the presence of a well-known chain transfer agent, such as amines, alcohols, substituted benzenes, chloroform, mercapto compounds, ketones, etc., in the polymerization system. By using hydrogen peroxide as the polymerization initiator according to the present invention, the phenomenon of excessively accelerated polymerization speed (runaway of the polymerization reaction) is suppressed effectively, so that there is no necessity of adding any polymerization retarder to the polymerization system. However, there are cases that the addition is desirable, for example when the stirring in the polymerization tank is insufficient or when the heat transfer efficiency is little.

For the purpose of regulating the molecular weight of the resulting polymer and for controlling the polymerization speed, a reducing agent may be added to the polymerization system together with hydrogen peroxide. Such reducing agents include reducing sulfoxy compounds such as Rongalit, sulfurous acid, sulfites, hydrosulfites, bisulfites, methabisulfites, thiosulfates, etc.; amines such as monoethanolamine, triethanolamine, etc.; disodium phosphite; reducing organic acids such as tartaric acid, 1-ascorbic acid, etc.

As a method for regulating the polymerization speed in the present invention, it is also very effective to vary the pH of the aqueous phase to be supplied to the polymerization system. The pH of the aqueous phase is employed generally within the range of from 1.0 to 9, preferably from 1.5 to 8. In such as pH range, the polymerization speed is fast in the low pH region and slow in the high pH region. Since the degree of color of the resulting polymer is considerably influenced by the pH of the aqueous phase to be supplied to the polymerization system, it is desirable to employ a pH between 3 and 7 to obtain a polymer having an excellent whiteness.

It is also permissible to add to the polymerization system, additives for improving the properties of the resulting polymer, for example anit-discoloration agents, stabilizers against heat, flame retardants, antistatics, stabilizers against ultraviolet ray, pigments, etc. in an amount within the range in which they do not adversely affect the polymerization according to the present invention.

The polymerization time in the process of the present invention is varied depending on the amount of the polymerization initiator, monomer concentration, polymerization pH, polymerization temperature, etc. but a duration of generally 5 minutes to 2 hours, preferably 15 minutes to one hour is employed. Thus, it can be enumerated as one of the advantages of the present invention that the polymerization according to the present invention can be accomplished within a short time. The polymerization reaction according to the present invention may be carried out by a batch method or a continuous method or by a method in which both are combined.

The transparent acrylonitrile polymer in a substantially melted state produced according to the polymerization process of the present invention may be provided directly or after separating the polymer melt phase from the water phase for spinning, film-formation or shaping. Besides, the polymerization melt, after a solvent for the acrylonitrile polymer (for example an aqueous solution of an inorganic salt such as zinc chloride, thiocyanate; inorganic solvent such as nitric acid; organic solvent such as dimethylformamide, dimethylacetamide, dimethyl sulfoxide, γ-butyrolactone, ethylene carbonate, etc.) has been introduced thereto under pressure and mixed therewith, may be produced in the usual way into fibers by wet-spinning or dry-spinning, or into films, etc. In general, when employing polymerization conditions that water is present in an amount above about 50 %, the resulting polymer is formed into fine, melted droplets, and therefore when cooled under stirring so that the melted droplets are not agglutinated with each other, it is possible to obtain microbeads or an aqueous dispersion (emulsion) of the acrylonitrile polymer improved in whiteness. In the present invention, as the practical polymerization ratio, a value within the range of from about 55 to about 97 % is employed. Therefore, a certain amount of unreacted monomer remains in the melted polymer obtained. But such unreacted monomer is recovered by some suitable means in the step of spinning, film-formation or shaping or after cooling the polymerization product, and can be reused.

By the process of the present invention, the polymerization step can be extremely simplified, and at the same time the amount of water and heat energy to be used can be markedly reduced. Furthermore, shaped products can be obtained without using any solvent and thus the process has an advantage that the recovery of the solvent and the problem of its high-degree purification can be avoided. In a polymerization at high temperature under increased pressure as in the present invention, the polymerization is carried out in a melted state and therefore the transport (transfer) of the polymer is relatively easy in comparison with the case of mass polymerization. However, because of a high monomer concentration in the polymerization system, the system is in a condition that a runaway reaction may be caused, and in addition there is a problem of the discoloration of the resulting polymer due to the employment of high-temperature conditions. However, the complete solution of these problems by the use of the specific polymerization initiator according to the present invention, markedly heightens the industrial importance of the present invention.

The present invention will be explained in further detail by way of examples, but the invention is not limited for its scope by these examples. In the examples, parts and percentages are by weight unless otherwise specified. The APHA numbers (American Public Health Association numbers) mentioned in the examples are values calculated by the APHA standard curve, of the degree of absorbance for a transmitted light of 430 mμ through a sample solution of 0.4 g. polymer in 20 ml. dimethylformamide. The greater this number, the greater is the degree of discoloration.

EXAMPLE 1

A monomer mixture consisting of 94 mol % acrylonitrile and 6 mol % methyl acrylate and water in which each of the various polymerization initiators shown in Table 1 had been dissolved, were put in a hard glass tube, 5 mm. in diameter and 150 mm. in length, with the lower end closed. After the air in the vacant portion was replaced with nitrogen gas, each glass tube was fusion-closed. The ratio of monomer: water was set at 8:2 or 9:1 and the concentration of each initiator was adjusted such that the initiator forms 1 % based on the monomers. The reaction mixture contained in the glass tube was allowed to stand still in an oil bath at 100° C.

or 150° C. for 60 minutes for polymerization. The results are shown in Table 1.

As apparent from the results in Table 1, when hydrogen peroxide was used as the polymerization initiator according to the present invention, a transparent, colorless and viscous acrylonitrile copolymer in a substantially melted state was obtained in a high yield. On the other hand, when inorganic water-souble polymerization initiators were used, the polymerization ratios were very low and polymers insoluble in dimethylformamide were obtained.

Table 1

| Polymerization initiator | Monomer: water | Polymerization temp.(° C.) | Monomer conversion (%) | Molecular weight |
|---|---|---|---|---|
| $H_2O_2$ | 9:1 | 110 | 80.7 | 60800 |
| $H_2O_2$ | 8:2 | 150 | 79.6 | 42000 |
| $(NH_4)_2S_2O_8$ | 9:1 | 100 | 48.2 | insoluble in DMF |
| " | 8:2 | 100 | 45.5 | " |
| " | 8:2 | 150 | 2.4 | — |
| cerium sulfate | 8:2 | 150 | 23.1 | insoluble in DMF |

EXAMPLE 2

A monomer mixture consisting of 94 mol % acrylonitrile and 6 mol % methyl acrylate, water and an aqueous hydrogen peroxide solution in the ratios shown in Table 2, were put in glass tubes in the same way as in Example 1 and the glass tubes were fusion-closed. Then the polymerization reaction mixtures in the glass tubes were subjected to polymerization under the various polymerization conditions shown in Table 2, in which the results are shown.

As apparent from the results in Table 2, acrylonitrile copolymer melts were obtained in a high yield over a wide temperature range.

Table 2

| Monomer conc. in polymerization system, % | Amount of $H_2O_2$ based on monomer, % | Polymerization conditions Temp. (° C.) | Time (min.) | Monomer conversion (%) | Molecular weight |
|---|---|---|---|---|---|
| 85 | 3.8 | 100 | 60 | 80.4 | 42900 |
| 90 | 3.8 | 100 | 60 | 75.2 | 44000 |
| 85 | 1.0 | 110 | 30 | 60.6 | — |
| 85 | 1.0 | 110 | 60 | 81.1 | 74200 |
| 88 | 1.0 | 120 | 60 | 83.5 | 49600 |
| 85 | 1.0 | 130 | 60 | 87.5 | — |
| 85 | 0.5 | 150 | 30 | 68.5 | — |
| 85 | 0.5 | 150 | 60 | 86.9 | 54800 |

EXAMPLE 3

Eighty five parts of a monomer mixture consisting of 94 mol % acrylonitrile and 6 mol % methyl acrylate and 15 parts of water were subjected to polymerization in the presence of the various polymerization initiators shown in Table 3 under the various polymerization conditions in said table in the same way as in Example 1. The results are shown in Table 3.

It is apparent from the results in Table 3 that when hydrogen peroxide was used as the polymerization initiator, the polymer melts obtained were very slightly colored, namely much improved in whiteness in comparison with the case in which conventional azo-type initiators or organic peroxide-type initiators were used.

Table 3

| Polymerization initiator Kind | % on monomer | Polymerization temp. × time (° C. × min.) | Monomer conversion (%) | Molecular weight | APHA number | Color of melt |
|---|---|---|---|---|---|---|
| $H_2O_2$ | 3.8 | 100 × 60 | 80.4 | 42900 | 120 | colorless |
| " | 1.0 | 110 × 60 | 83.4 | 76200 | 136 | " |
| " | 1.0 | 120 × 60 | 80.5 | 69800 | 165 | " |
| " | 0.8 | 130 × 60 | 74.3 | 98600 | 205 | pale yellow |
| " | 0.5 | 150 × 60 | 86.9 | 54800 | 360 | " |
| BPO | 0.5 | 100 × 60 | 90.4 | 76700 | 440 | yellow |
| " | 0.6 | 110 × 60 | 69.1 | 73500 | 550 | deep yellow |
| AIBN | 1.0 | 100 × 60 | 79.3 | 60500 | 400 | yellow |
| " | 0.5 | 110 × 60 | 46.4 | — | 405 | " |
| DBPO | 2.0 | 120 × 60 | 91.3 | 141100 | 225 | pale yellow |
| " | 0.5 | 150 × 60 | 91.2 | 111100 | 435 | yellow |

(Note)
BPO = benzoyl peroxide
AIBN = azobisisobutyronitrile
DBPO = di-tert-butyl peroxide

EXAMPLE 4

Eighty five parts of a monomer solution consisting of 94 mol % acrylonitrile and 15 parts of water were subjected to polymerization in the presence of the various initiators shown in Table 4 under the various polymerization conditions shown in said table in the same way as in Example 1. Polymerization ratios at various points of polymerization time were obtained and the results are shown in Table 5.

From the results in Table 5, it is seen that when hydrogen peroxide was used as the polymerization initiator, the initial polymerization speed was slower than in the case in which azo-type initiators or organic peroxide-type initiators were used, the aspect being such that as if a polymerization retarder was added to the polymerization system. Thus, it is an important feature that the runaway of the polymerization reaction is remarkably suppressed. Furthermore, Table 5 shows that, in the case of the hydrogen peroxide initiator, when the polymerization temperature was varied from 110° C. to 150° C., the polymerization speed was only very slightly affected. This suggests that when the initiator according to the present invention is used, the operation can be very stable even in a polymerization equipment on an industrial scale.

Table 4

| Exp. No. | 1 | 2 | 3 | 4 | 5 | 6* | 7 | 8 |
|---|---|---|---|---|---|---|---|---|
| Initiator: Kind | $H_2O_2$ | $H_2O_2$ | $H_2O_2$ | $H_2O_2$ | DBPO | DBPO | BPO | AIBN |
| % on monomer | 1.0 | 0.5 | 1.0 | 0.5 | 0.5 | 0.5 | 0.6 | 0.8 |
| Polymerization temp. (° C.) | 110 | 150 | 150 | 110 | 150 | 150 | 110 | 100 |

*Besides the initiator, a polymerization retarder (2,6-di-tert-butyl-4-methylphenol) was added in an amount of 2% based on the monomer mixture.

Table 5

| Exp. no. | Monomer conversion (%) | | | | | | | |
|---|---|---|---|---|---|---|---|---|
| | 1 | 2 | 3 | 4 | 5 | 6 | 7 | 8 |
| polymerization time (min.) 3 | 1 | 10 | 10 | — | 40 | 16 | 29 | 42 |
| 5 | 5 | 24 | 25 | 0.1 | 68 | 39 | 57 | 58 |
| 10 | 21 | 47 | 56 | — | 88 | 58 | 66 | 59 |
| 15 | 28 | 62 | 80 | 3.4 | 89 | 64 | 67 | 69 |
| 30 | 60 | 72 | 81 | 14 | 91 | 77 | 71 | 73 |
| 60 | 78 | 81 | 83 | 40 | 92 | 81 | 70 | 80 |

EXAMPLE 5

An experiment according to the present invention was carried out using an autoclave made of stainless steel, 700 ml. in capacity, equipped with a partition-walled magnetic stirrer and at the bottom, a nozzle having small orifices of a diameter of 0.7 mm. The autoclave had an outside jacket in which polyethylene glycol was made to circulate as the heating medium.

Before the start of polymerization, the nozzle orifices were closed. Then 85 parts of a monomer mixture consisting of 94 mol % acrylonitrile and 6 mol % methyl acrylate and 15 parts of water in which 1 % hydrogen peroxide based on the monomer mixture was dissolved, were poured through an inlet positioned at the upper part of the autoclave. After the air in the vacant space was replaced with nitrogen, the inlet was closed. Thereafter, the polymerization mixture in the autoclave was heated to 110° C. with a temperature rise speed of 4° C./min. while the mixture was stirred and the heated polyethylene glycol was caused to circulate. The reaction mixture was then maintained at this temperature for 1.5 hours to complete the polymerization. The self-generated pressure was about 10 kg/cm$^2$. The resulting polymer was further heated to 130° C. at a temperature rise speed of 4° C./min. Thereafter, by removing the plug of the nozzle orifices at the bottom of the autoclave, the polymer melt was extruded continuously and stably. Transparent compact fibers were obtained.

What we claim is:

1. In a process for producing an acrylonitrile polymer in a substantially melted state by polymerizing acrylonitrile alone or a monomer mixture consisting of at least 75 % by weight of acrylonitrile and as the remainder at least one different ethylenically unsaturated compound in a system in which water is present in an amount in the range of from 3 to 80 weight percent based on the total amount of the monomer(s) and water, under a pressure above the self-generated pressure at a temperature above 80° C., the improvement characterized by using hydrogen peroxide as the polymerization initiator.

2. A process as claimed in claim 1 wherein the polymerization system contains water in an amount of 3-50 % by weight based on total of water and monomer(s).

3. A process as claimed in claim 1 wherein the polymerization system contains water in an amount of 5-30 % by weight based on total of water and monomer(s).

4. A process as claimed in claim 1 wherein the polymerization is conducted at a temperature not lower than 120° C.

5. A process as claimed in claim 1 wherein the polymerization is conducted at a temperature not lower than 130° C.

6. A process as claimed in claim 1 wherein the pressure of the polymerization system is about 3 atmospheres to about 100 atmospheres.

7. A process as claimed in claim 1 wherein hydrogen peroxide is supplied to the polymerization system in the form of an aqueous solution.

8. A process as claimed in claim 1 wherein the amount of hydrogen peroxide is 0.1-8 % by weight based on the monomer(s).

9. A process as claimed in claim 1 wherein the amount of hydrogen peroxide is 0.3-5 % by weight based on the monomer(s).

10. A process as claimed in claim 1 wherein the polymerization is maintained at a pH of 3-7.

* * * * *